(12) United States Patent
Kumar et al.

(10) Patent No.: US 12,058,142 B2
(45) Date of Patent: Aug. 6, 2024

(54) DYNAMIC PRIVILEGED ACCESS REQUEST SYSTEM

(71) Applicant: Rakuten Symphony Singapore Pte. Ltd., Singapore (SG)

(72) Inventors: Rajneesh Kumar, Tokyo (JP); Remi Ferreres, Singapore (SG)

(73) Assignee: RAKUTEN SYMPHONY SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/768,855

(22) PCT Filed: Mar. 25, 2022

(86) PCT No.: PCT/US2022/021845
§ 371 (c)(1),
(2) Date: Apr. 14, 2022

(87) PCT Pub. No.: WO2023/183000
PCT Pub. Date: Sep. 28, 2023

(65) Prior Publication Data
US 2024/0137368 A1    Apr. 25, 2024

(51) Int. Cl.
*H04L 9/40* (2022.01)
(52) U.S. Cl.
CPC .......... *H04L 63/108* (2013.01); *H04L 63/102* (2013.01); *H04L 63/105* (2013.01)

(58) Field of Classification Search
CPC ............................ H04L 63/102; H04L 63/105
See application file for complete search history.

(56) References Cited

U.S. PATENT DOCUMENTS

| 11,444,951 | B1 * | 9/2022 | Patil | H04L 63/102 |
| 2022/0311777 | A1 * | 9/2022 | Makenzi | H04L 63/029 |
| 2023/0259647 | A1 * | 8/2023 | Yip | G06F 21/604 726/28 |

FOREIGN PATENT DOCUMENTS

WO    WO-2023177399 A1 *  9/2023

* cited by examiner

*Primary Examiner* — Brian Whipple
(74) *Attorney, Agent, or Firm* — HAUPTMAN HAM, LLP

(57) ABSTRACT

Centralized privileged access is managed by receiving a request for privileged access to a device connected to a network, the request including a device identifier and a first user identifier, determining a role risk associated with the request based on a requested privilege level included in the request, determining an impact risk associated with the request based on potentially impacted devices other than the device, determining a risk level associated with the request based on the role risk and the impact risk, identifying a second user to control authorization of the device based on the risk level, and scheduling, in response to receiving authorization from the second user, a process to modify an entry in a permissions database to associate the first user identifier and the device identifier with the requested privilege level for the duration.

20 Claims, 14 Drawing Sheets

330

```
┌─────────────────────────────────────────────┐
│         PRIVILEGED ACCESS REQUEST FORM      │
├─────────────────────────────────────────────┤
│  ┌──────────────────┐   ┌──────────────────┐│
│  │      USERS       │   │     DEVICES      ││
│  ├──────────────────┤   ├──────────────────┤│
│  │ User A9          │   │ Router 24        ││
│  │ User 42    332   │   │ Switch 1A5  334  ││
│  │ Group 7          │   │                  ││
│  │                  │   │                  ││
│  │       336        │   │                  ││
│  └──────────────────┘   └──────────────────┘│
│                                             │
│  PRIVILEGE LEVEL  │ Edit access          │  │
│                                             │
│  START │ 5/11 09:30 │   END │ 5/11 15:00 │  │
│   338                      339              │
│                   ( SUBMIT )                │
│                348                          │
└─────────────────────────────────────────────┘
```

*FIG. 3*

PRIVILEGED ACCESS REQUEST LIST

| REQUEST ID | STATUS | RISK LEVEL |
|---|---|---|
| 20220511-03 | Requested | Very High |
| 20220510-23 | Approved | High |
| 20220510-19 | In-Progress | Medium |
| 20220510-08 | Provisioned | Very Low |
| 20220510-02 | De-provisioned | Very High |
| 20220509-68 | Rejected | Low |
| 20220509-57 | Cancelled | Low |
| 20220509-54 | Failed | Medium |

USERS
User A9
User 42
Group 7

DEVICES
Router 24
Switch 1A5

PRIVILEGE LEVEL: Edit access

IMPACT RISK: High
ROLE RISK: Medium

REQUESTOR: User A9

START 5/11 09:30    END 5/11 15:00

APPROVE    REJECT

*FIG. 4*

DEVICE LIST

| DEVICE ID | STATUS | LOCK STATUS |
|---|---|---|
| Router 24 | Non-Compliant | Unlocked |
| CU 8 | Non-Compliant | Locked |
| Switch 1A5 | Compliant | Unlocked |
| DU 39 | Compliant | Unlocked |
| Switch FE | Compliant | Unlocked |
| RU 24D | Non-Compliant | Locked |
| Switch 62 | Non-Compliant | Locked |
| Router C6 | Compliant | Unlocked |

DEVICE ID: Router 24

STATUS: Non-Compliant

DEVICE PROFILE: Router

IMPACT RISK: High

OWNER: User 42

[ ADD ]  [ UNLOCK ]  [ LOCK ]

*FIG. 5*

DEVICE PROFILE LIST

| PROFILE ID | IMPACT RISK | ROLE ID |
|---|---|---|
| Router | High | Read Only +2 |
| Switch | Medium | Edit +3 |
| CU | High | Limited +2 |
| DU | Medium | Elevated +1 |
| RU | Small | Admin +4 |

642, 644, 640, 647, 641, 631

DEVICE PROFILE ID: Router

| ROLE ID | DEVICES |
|---|---|
| Read Only | Router 24 |
| Limited | Router C6 |
| Edit | Router 49 |

633, 634

IMPACT RISK: High  635

MODIFIED BY: User F7  643

ADD   SAVE   CANCEL 645   648   649

*FIG. 6*

ROLE LIST

| ROLE ID (742) | STATUS (744) | ROLE RISK (747) |
|---|---|---|
| Limited | Non-Compliant | Medium |
| Read Only | Compliant | Low |
| Elevated | Compliant | High |
| Admin | Non-Compliant | High |
| Edit | Compliant | Medium |

740 / 741 / 733

ROLE ID: Limited
STATUS (744): Non-Compliant
ROLE RISK (747): Medium

MODIFIED BY (743): User 42

[ADD] (745)  [MODIFY] (748)  [CANCEL] (749)

*FIG. 7*

| ROLE RISK LIST | | |
|---|---|---|
| ROLE RISK ID | COLOR | MODIFIED BY |
| High | Red | User 6B |
| Medium | Orange | User A9 |
| Low | Yellow | User 42 |

ROLE RISK ID: High

COLOR: Red

DESCRIPTION: This can have Sudo/Super admin level of access. This level of access could severely impact service on this device and other devices.

MODIFIED BY: User 6B

[ ADD ]   [ MODIFY ]   [ CANCEL ]

*FIG. 8*

IMPACT RISK LIST

| IMPACT RISK ID | COLOR | MODIFIED BY |
|---|---|---|
| High | Red | User 42 |
| Medium | Orange | User 6B |
| Low | Yellow | User 42 |

IMPACT RISK ID: High

COLOR: Red

DESCRIPTION: Impact can be across multiple network domains (more than 100 devices).

MODIFIED BY: User 42

[ADD]  [MODIFY]  [CANCEL]

*FIG. 9*

```
<USER-PRIVILEGES>
   <USER-ID>User A9
      <DEFAULT-ROLE>Read-Only
      <EDIT-PRIVILEGE>Router 43, Switch 26A
      <ADMIN-PRIVILEGE>None
      <AUTHORITY>None

```
<DEVICE-PRIVILEGES>
   <DEVICE-ID>Router 24
      <EDIT-PRIVILEGE>Group 5
      <ADMIN-PRIVILEGE>User 7A
      <AUTHORITY>User E2
      <IMPACT-RISK>High

DYNAMIC PRIVILEGED ACCESS REQUEST SYSTEM

RELATED APPLICATIONS

The present application is a National Phase of International Application No. PCT/US2022/021845, filed Mar. 25, 2022.

BACKGROUND

During constructing, developing, and maintaining a network system, users request privileged access for some specific network resource(s) and/or network device(s) for a certain period. Privileged access is the authority a user has in, for example, overriding, bypassing, accessing, or configuring certain security restraints. One example privileged access is permission to perform an action such as shutting down a service, loading new device drivers, configuring network services, etc. Privileged access is managed through a process of assigning, retracting, or configuring privileged access of users to perform certain actions involving certain resources and/or devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a graphical user interface of a form for privileged access requesting, according to at least some embodiments of the present invention.

FIG. 4 is a graphical user interface for privileged access request review, according to at least some embodiments of the present invention.

FIG. 5 is a graphical user interface for device review, according to at least some embodiments of the present invention.

FIG. 6 is a graphical user interface for device profile review, according to at least some embodiments of the present invention.

FIG. 7 is a graphical user interface for role review, according to at least some embodiments of the present invention.

FIG. 8 is a graphical user interface for role risk review, according to at least some embodiments of the present invention.

FIG. 9 is a graphical user interface for impact risk review, according to at least some embodiments of the present invention.

FIG. 10 is a portion of a permissions database, according to at least some embodiments of the present invention.

FIG. 11 is a portion of an inventory database, according to at least some embodiments of the present invention.

DETAILED DESCRIPTION

Figure 1:
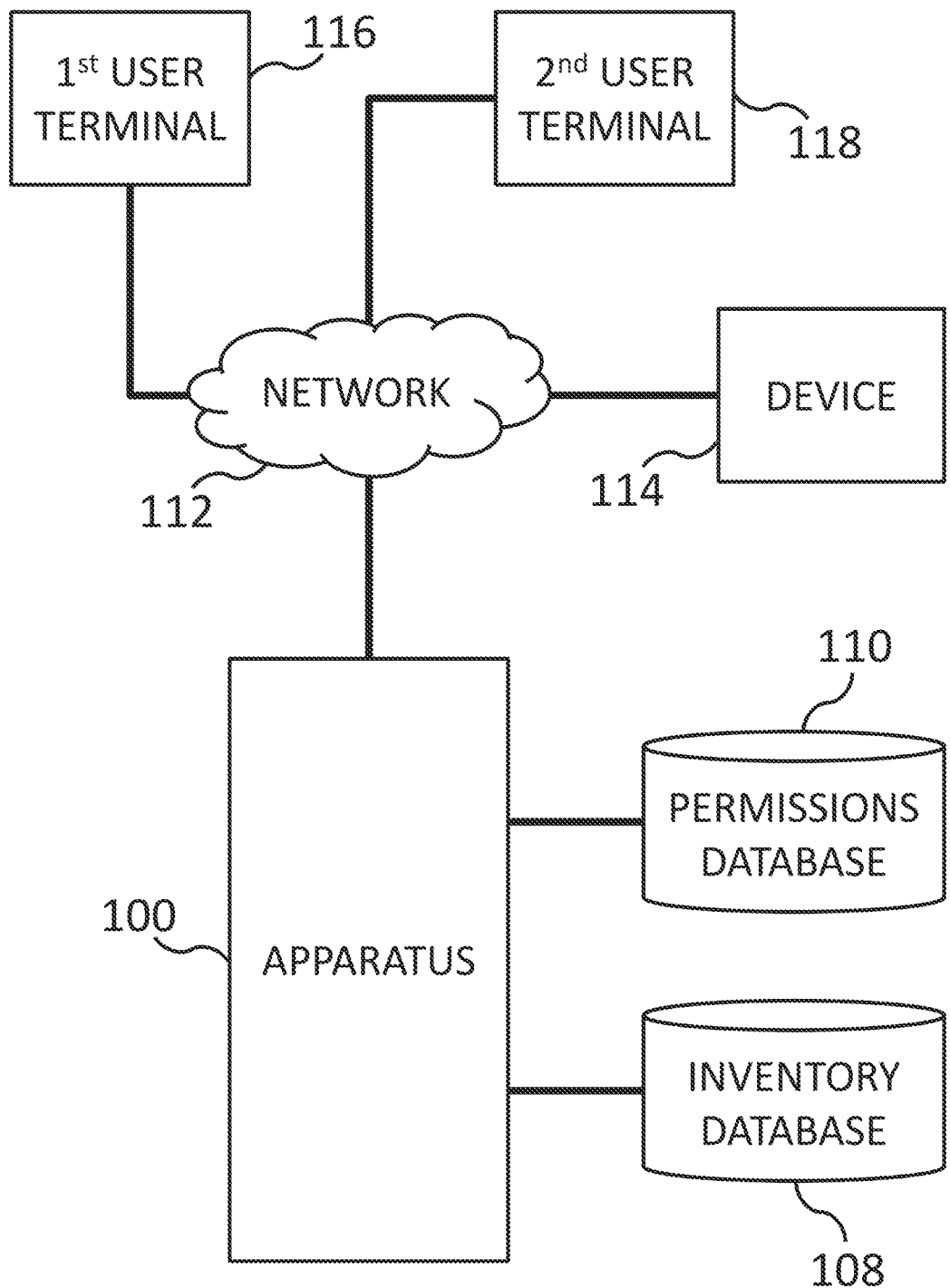
FIG. 1 is a schematic diagram of a privileged access request system, according to at least some embodiments of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

A simplified approach to privileged access management would be to allow users to request and subsequently grant privileged access of a fixed set of permissions for 24 hours. However, different users have different purposes and requirements for requesting privileged access. A fixed set of permissions will be more than required for some purposes and insufficient for other purposes. Likewise, the fixed duration of 24 hours for the privileged access will be more than required for some purposes, potentially exposing the system to security threats, and insufficient for other purposes, burdening users to renew or re-apply for the same privileged access. As the number of users involved in a network and the number of services and devices accessible by users increases, the safety and efficiency of such simplified approaches decreases.

Furthermore, services and devices provided by different vendors or contractors having different permissions included in the respective fixed set of permissions is likely to be burdensome and confusing for users requesting privileged access from such different vendors or contractors.

At least some embodiments herein provide a privileged access management system, which enables multiple users to request privileged access with a set of permissions based on a specific purpose. At least some embodiments herein enable users to request privileged access by themselves, as well as on behalf of other users.

In at least some embodiments, a privileged access management system enables users to request privileged access to network devices via an Application Programming Interface (API). In at least some embodiments, the system controls the granularity of privileged access, such as read-only access, read-write access, and the like, instead of a uniform set of permissions. In at least some embodiments, the system managing the privileged access granted to users via the centralized API to reduce the risk of network intrusion in an environment with a plethora of devices.

An example of such an environment is a radio access network using Open Radio Access Network (RAN). Open RAN enables interoperability of equipment between vendors, flexibility in where the data received from the radio network is processed, and processing of information to be distributed away from the base stations. An Open RAN includes multiple devices, such as routers and other hardware, distributed over a wide area, and which are made and supported by different vendors.

In at least some embodiments, the system grants time limited access for a customizable amount of time to the device on the network. In at least some embodiments, the system schedules access to the network device at a later time and for the customizable limited time period.

FIG. 1 is a diagram of a privileged access request system, according to at least some embodiments of the present invention. In at least some embodiments, the system includes a cloud architecture. In at least some embodiments, the system hosts a cluster of servers. In at least some embodiments, the system hosts a public cloud, a private cloud, and/or a hybrid cloud. The diagram includes an apparatus 100, an inventory database 108, a permissions database 110, a network 112, a device 114, a first user terminal 116 and a second user terminal 118.

Network 112 is configured to enable communication among at least apparatus 100, device 114, first user terminal 116, and second user terminal 118. In at least some embodiments, network 112 is a RAN. In at least some embodiments, network 112 is configured to operate under network compliances to 4G standards, 5G standards, or any other wide area radio access network protocol. In at least some embodiments, the system is an Open RAN environment.

In at least some embodiments, the system is disaggregated into three main building blocks, Radio Units (RU), Distributed Units (DU), and Central Units (CU). In at least some embodiments, an RU receives, transmits, amplifies, and digitizes radio frequency signals. In at least some embodiments, the RU is located near, or integrated into the antenna. In at least some embodiments, a DU and a CU form a computational component of a base station, sending the digitalized radio signal into the network. In at least some embodiments, the DU is physically located at or near the RU. In at least some embodiments, the CU is physically distant from the DU and RU and is located nearer the core. In at least some embodiments, device 114 is one of an RU, a DU, or a CU.

In at least some embodiments, the system architecture 100 implements the Open RAN based on protocols and interfaces between these various building blocks (radios, hardware, and software) in the RAN. Examples of Open RAN interfaces include a front-haul between the Radio Unit and the Distributed Unit, a mid-haul between the Distributed Unit and the Centralized Unit and a back-haul connecting the RAN to the core. In at least some embodiments, the DU and/or the CU are virtualized and run in a server or a cluster of servers. In at least some embodiments, network 112 includes front-hauls, mid-hauls, and back-hauls.

Apparatus 100 is in communication with inventory database 108 and permissions database 110. In at least some embodiments, apparatus 100 is configured to perform privileged access management. In at least some embodiments, the inventory database 108 stores a list of devices connected to network 112. In at least some embodiments, the inventory database 108 hosts a list of devices in an Open RAN network, such as RU devices, DU devices, CU devices, and the like. In at least some embodiments, inventory database 108 contains information about devices from different users, including information about the program defaults, administration information of the devices, and/or any suitable information of the devices.

In at least some embodiments, permissions database 110 stores information about users and groups that are assigned to users. In at least some embodiments, a group defines a default privilege level available to assigned users of devices in the network. In at least some embodiments, permissions database 110 is a directory service that controls a modes system for controlling object access in operating systems. In at least some embodiments, apparatus 100 is configured to periodically query inventory database 108 and permissions database 110 for information about the devices on the network, the users, and their assigned groups, and to store the information using internal storage or external storage. In at least some embodiments, apparatus 100 is configured to query inventory database 108 and permissions database 110 for information about the devices on the network, the users, and their assigned groups in response to requests from user terminals, devices, etc.

In at least some embodiments, apparatus 100 is configured to, based on a determination that the user of user terminal 116 is not authorized to access the requested device and/or service, identify a system administrator or other user with sufficient privilege level to authorize the access request. In one or more examples, the system administrator has privileged access to the network devices and services, and has permission to authorize other users to access the devices and services. In at least some embodiments, apparatus 100 is configured to receive authorization from the system administrator, and to schedule a modification of the information in permissions database 110 so that the user of first user terminal 116 is able to access to the device. In at least some embodiments, apparatus 100 is configured to schedule another modification to permission database 110 to retract the access to the device and/or service at expiration of the time-limit for which the authorization was approved.

In at least some embodiments, apparatus 100 is configured to receive a request from first user terminal 116 requesting access to a device and/or service. In at least some embodiments, apparatus 100 is configured to associate the request with the user of first user terminal 116 using a request identification (ID). In at least some embodiments, apparatus 100 is configured to maintain a list of requests associated with the users included in the request, the purpose or the task included in the request, the status of the request, or the like. In at least some embodiments, apparatus 100 is configured to present a graphical user interface to enable the user to cancel a request, modify a request, or the like. In at least some embodiments, apparatus 100 is configured to provide information of the workflow associated with a request.

In at least some embodiments, users included in an authorized privilege access request are enabled to access the requested device and/or service. At least one of apparatus 100, device 114, and/or service provider is configured to authenticate first user terminal 116 based on information from permissions database 110. In at least some embodiments, apparatus 100 is configured to check permissions database 110 before permitting authentication as a default procedure. In at least some embodiments, apparatus 100 is configured to revert the modification made to the information in permission database 110 to retract the assigned access to the device and/or service at the scheduled end time. In at least some embodiments, the device and/or service provider is configured to periodically check permissions database 110 while first user terminal 116 is accessing the device and/or service. In at least some embodiments, at the end of the scheduled time the users included in an authorized privilege access request no longer have access to device 114, and any remaining connections to device 114 are terminated.

Figure 2:
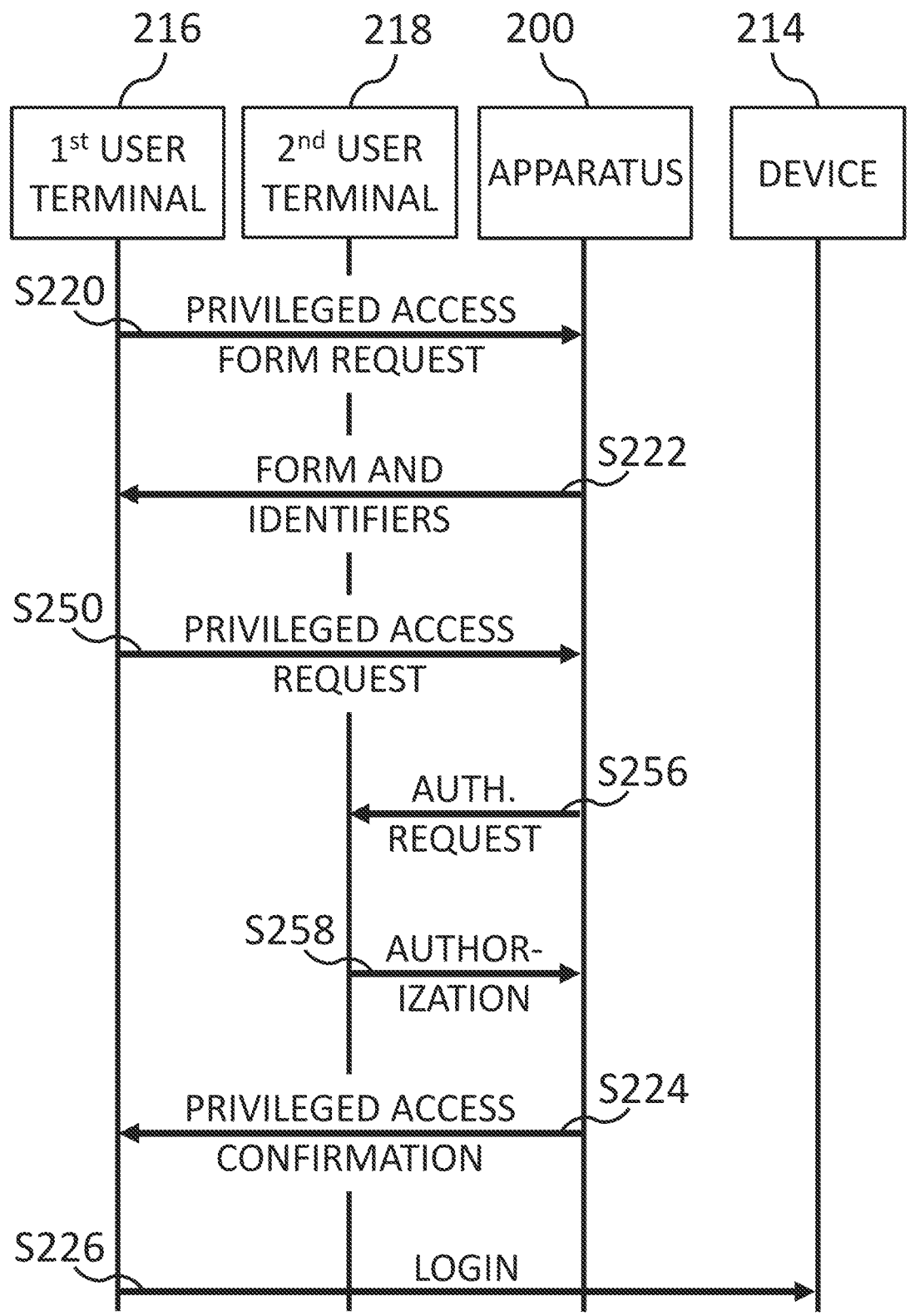
FIG. 2 is a communication flow for privileged access requesting, according to at least some embodiments of the present invention.

FIG. 2 is a communication flow for privileged access requesting, according to at least some embodiments of the present invention. The communication flow is conducted to perform a process of privileged access management. In at least some embodiments, the communication flow is conducted among a first user terminal 216, a second user terminal 218, an apparatus 200, and a device 214.

At S220, first user terminal 216 transmits a request for a privileged access request interface to apparatus 200. In at least some embodiments, apparatus 200 receives a request for the interface to compose the request for privileged access from a terminal via the interface.

At S222, apparatus 200 transmits the privilege access request interface to first user terminal 216. In at least some embodiments, apparatus 200 transmits a plurality of device identifiers, a plurality of user identifiers, and a plurality of privilege levels to the terminal, each device identifier identifying a device connected to the network, each user identifier identifying a user of the network. In at least some embodiments, first user terminal 216 displays a graphical user interface to enable a user to compose the privileged access request. In at least some embodiments, apparatus transmits the graphical user interface to first user terminal 216. In at least some embodiments, apparatus 200 is configured to receive a request from the user terminal 216 to access a device and/or service (e.g., access via an API, direct access, etc.). In one or more examples, apparatus 200 is configured to enable interactive selection of users, devices and services available, privilege level, duration of access, etc. In one or more examples, apparatus 200 is configured to host information for first user terminal 216 to display a graphical user interface, such as in a webpage accessible by first user terminal 216, in an application hosted in a server communicatively coupled to first user terminal 216, in an application installed on first user terminal 216, etc., that enables the user of first user terminal 216 to select, from one or more lists, users on behalf of which access is requested, the device(s) and/or service(s), the purpose for which access is requested, the privilege level of the requested access, and/or the duration of the requested access. In at least some embodiments, first user terminal 216 generates a graphical user interface that allows the first user to interact with apparatus 200. In at least some embodiments, first user terminal 216 retrieves a list of devices on the network to allow the first user to select the devices to generate the privileged access request. In at least some embodiments, first user device 216 determines a minimum privilege level that allows the first user to fulfil the purpose of the request. In at least some embodiments, first user device 216 determines whether the first user should receive read-only access, admin access, super admin access, or another privilege level based on the purpose of the request.

At S250, first user terminal 216 transmits a privileged access request to apparatus 200. In at least some embodiments, apparatus 200 receives a request from first user terminal 216 to access a device/service for a specific duration and purpose. In at least some embodiments, apparatus 200 is configured to receive requests from first user terminal 216 to request access to a device or a service on behalf of a user. In at least some embodiments, first user terminal 216 is configured to request access to the device or a service via an API. For example, in a network deployment, a field technician whose role is to maintain the device uses first user terminal 216 to transmit, to apparatus 200, a request to access the device for a limited time. In at least some embodiments, apparatus 200 associates a request identification (ID) with the privileged access request from the first user. In at least some embodiments, apparatus 200 stores a log of requests associated with an identifier of the first user in the permissions database. In at least some embodiments, apparatus 200 utilizes the request ID to keep track of the risk associated with the first user.

In at least some embodiments, apparatus 200 determines the role risk associated with the first user, the impact risk associated with device 214, or both, based on the information in the privileged access request. In at least some embodiments, apparatus 200 retrieves the role risk profile for the first user from the permissions database and the impact risk profile for device 214 from the inventory database. In at least some embodiments, apparatus 200 determines the risk level based on the role risk, the impact risk, and any other factors of the privileged access request. In at least some embodiments, apparatus 200 determines a workflow for processing the privileged access request based on the determined risk level. In at least some embodiments, apparatus 200 requests authorization from an admin user, such as the user of second user terminal 218 based on the workflow.

At S256, apparatus 200 transmits an authorization request to a second user via second user terminal 218. In at least some embodiments, apparatus 200 selects the second user, and transmits the authorization request to the user terminal associated with the second user, second user terminal 218. In at least some embodiments, apparatus 200 associates the privileged access request with the second user and adds the privileged access request to a list of privileged access requests. In at least some embodiments, apparatus 200 makes the list of privileged access requests available for viewing and interaction through a graphical user interface. In at least some embodiments, apparatus 200 transmits the authorization request to second user terminal 218 in response to the second user using second user terminal 218 to view the list of privileged access requests and select the privileged access request for viewing and approval.

In at least some embodiments, apparatus 200 requests the second user, such as the user of second user terminal 218, to authorize the request for privileged access received from first user terminal 216. In at least some embodiments, apparatus 200 presents a list of devices and services, the levels of privileged access, and the associated groups along with the request to the second user. In one or more examples, apparatus 200 presents the request to authorize to the second user via a graphical user interface, such as in a webpage accessible by second user terminal 218, in an application hosted in a server communicatively coupled to second user terminal 218, in an application installed on second user terminal 218, etc., that enables the second user to interactively review, select and/or change the parameters, such as privilege level, requested access duration, etc., of the request received from the first user terminal 216, and to transmit authorization of the request.

In at least some embodiments, apparatus 200 receives a request from the second user via second user terminal 218 to modify a role risk profile associated with the first user from compliant to non-compliant or vice versa. In at least some embodiments, apparatus 200 updates the role risk profile in the permissions database in response to the request. In at least some embodiments, apparatus 200 receives a request from the second user via second user terminal 218 to modify the impact risk profile from active to inactive or vice versa. In at least some embodiments, apparatus 200 updates the impact risk profile in the inventory database in response to the request.

At S258, second user terminal 218 transmits authorization to apparatus 200. In at least some embodiments, apparatus 200 receives authorization from second user terminal 218 and, in response to receiving the authorization, schedules a modification to a permissions database. In one or more embodiments, apparatus 200 associates a first user identifier with an identifier of device 214 according to the applicable privilege level to the permissions database, provisions device 214, or any other operations to implement the authorized privileged access. In at least some embodiments, apparatus 200 schedules the modification at the scheduled start time, and schedules another modification to revert the privileged access in the permissions directory at the scheduled end time. In at least some embodiments, apparatus 200 determines the start time and the end time based on the requested start time and end time. In at least some embodiments, apparatus 200 receives the start time and the end time with the authorization received from second user terminal 218. In at least some embodiments, apparatus 200 determines the start time, the end time, or both based on a workflow.

At S224, apparatus 200 transmits confirmation of the privileged access request to first user terminal 216. In at least some embodiments, apparatus 200 transmits the privileged access request confirmation to the user terminal currently associated with the first user. In at least some embodiments, apparatus 200 transmits the privileged access request confirmation to first user terminal 216 in response to the first user using first user terminal 216 to view the list of privileged access requests and select the privileged access request for viewing. In at least some embodiments, apparatus 200 determines a granular privilege level to the device based on a task included the request in response to receiving authorization from the second user. In at least some embodiments, apparatus 200 determines the least permissive privileged access for the first user to complete the task. In at least some embodiments, the granular privilege levels include read-only access, admin access, or super administrator access.

At S226, first user terminal 216 performs a login to device 214. In at least some embodiments, first user terminal 216 communicates directly with device 214 to provide credentials for performing the login. In at least some embodiments, device 214 communicates with the permissions database to verify the privilege level associated with the first user, and the permissions database will only reflect the authorized privilege level within the authorized time frame or duration. In at least some embodiments, the modification to the permissions database enables the first user or first user terminal 216 privileged access to device 214 based on an assigned role or group in the permissions database for the requested duration. In at least some embodiments, apparatus 200 enables privileged access during the requested duration to perform a task. In at least some embodiments, after the requested duration apparatus 200 removes the first user or first user terminal 216 from the assigned role or group in the permissions directory so that the first user or first user terminal 216 no longer has privileged access after the requested duration.

FIG. 3 is a graphical user interface of a form for privileged access requesting, according to at least some embodiments of the present invention. In at least some embodiments, the privileged access request interface is any type of interface (e.g., form, chart, table, etc.) which enables a user to enter specifics of a privileged access request. In at least some embodiments, the graphical user interface is presented by a display of a user terminal, such as first user terminal 116 of FIG. 1. In at least some embodiments, the graphical user interface is configured to interact with user input from the user terminal. In at least some embodiments, the graphical user interface is configured to receive and display information from an apparatus, such as apparatus 100 of FIG. 1 and apparatus 200 of FIG. 2. The graphical user interface shows a privileged access request interface 330 including a user field 332, a device field 334, a privilege level field 336, a starting time field 338, an ending time field 339, and a submission button 348. In at least some embodiments, privileged access request interface 330 includes more or less fields than illustrated in FIG. 3, and arrangement of the fields in privileged access request interface 330 varies from the arrangement illustrated in FIG. 3. In at least some embodiments, privileged access request interface 330 includes additional fields, such as a description field (e.g., for enabling the user to specify the reason of requesting the privileged access, etc.), an urgency level field (e.g., for enabling the user to specify the urgency of the request, etc.), etc. In at least some embodiments, user field 332, privilege level field 336, starting time field 338, ending time field 339, and other suitable fields are presented in multiple graphical user interfaces (e.g., multiple forms, a combination of a form and a table, etc.)

User field 332 is a listing of user identifiers. In at least some embodiments, user field 332 includes user identifiers for which privileged access is being requested. In at least some embodiments, user field 332 includes all user identifiers of the network, from which user identifiers are selected for the privileged access request. In at least some embodiments, user field 332 includes a group identifier, the group identifier associated with a plurality of user identifiers. User field 332 shows "User A9", "User 42", and "Group 7". A privileged access request composed as shown would effectively request privileged access for the user identified as "User A9", the user identified as "User 42", and all users belonging to "Group 7". In at least some embodiments, the user identifier of the user making the request is presented in a distinguishable manner (e.g., bold, highlighted, blinking, etc.), so that said user is easily identifiable from the listing of user identifiers. In at least some embodiments, user field 332 includes a search field to enable the user to search for a target user(s) or a target group(s) for which privileged access is being requested. In at least some embodiments, the search field is a search bar, wherein in response to user inputs of a keyword associated with the user identifiers of the target user(s) or the target group(s) user field 332 is updated to show only user identifiers partially or fully matching the inputted keyword. In at least some embodiments, the available user identifiers (e.g., all user identifiers of the network or user identifiers match the inputted keyword) are presented in a first portion of user field 332, and selected (via double-click, drag and drop, etc.) user identifiers are presented in a second portion of user field 332.

Device field 334 is a listing of device identifiers. In at least some embodiments, device field 334 includes device identifiers for which privileged access is being requested. In at least some embodiments, device field 334 includes all device identifiers of the network, from which device identifiers are selected for the privileged access request. In at least some embodiments, a device identifier identifies one of a router, a switch, or any other device in communication with the network. Device field 334 shows "Router 24" and "Switch IA5". A privileged access request composed as shown would effectively request privileged access to the device identified as "Router 24" and the device identified as "Switch IA5". In at least some embodiments, device field 334 is an input field in which the user directly specifies, to add or modify, a device name. In at least some embodiments, device field 334 includes a search field to enable the user to search for a target device(s) to which privileged access is being requested. In at least some embodiments, the search field is a search bar, wherein in response to user inputs of "device type", "vendor/service provider", "service", "domain" (e.g.—RAN, Core, etc.), "location type" (e.g.—Country, Prefecture, State, City, etc.), "location name" (e.g.—Japan, Osaka, etc.), a keyword, or any other information associated with the information of the target device(s) device field 334 is updated to show only device identifiers partially or fully matching the inputted keyword. In at least some embodiments, the available device identifiers (e.g., all device identifiers of the network or device identifiers match the inputted keyword) are presented in a first portion of device field 334, and selected (via double-click, drag and drop, etc.) device identifiers are presented in a second portion of device field 334.

Privilege level field 336 shows a privilege level associated with a bundle of permissions. In at least some embodiments, privilege level field 336 shows a privilege level at which privileged access is being requested. In at least some embodiments, privilege level field 336 shows all privilege levels recognized by an apparatus, such as apparatus 100 of FIG. 1, from which a privilege level is selected for the privilege access request. Privilege level field 336 shows "Edit access". A privileged access request composed as shown would effectively request a privileged access level identified as "Edit access" to the devices identified as "Router 24" and "Switch 1A5" for the users identified as "User A9", "User 42", and those belonging to "Group 7". In at least some embodiments, privilege level is defined by a role, such as a reader role, an editor role, an admin role, etc., and each role has multiple privileged accesses associated thereto (e.g., an editor role has edit access, download access, and view access, a reader role has view access and download access, etc.). In at least some embodiments, privilege level field 336 includes a drop-down list presenting privilege level(s) available to the user making the request, privilege level(s) available to the user(s) and/or group(s) selected in field 332, privilege level(s) available to the device(s) selected in field 334, and/or a combination thereof.

Starting time field 338 shows a starting time at which privileged access is being requested. In at least some embodiments, starting time field 338 includes a date and a time. In at least some embodiments, starting time field 338 represents the date and time at which a permissions database is modified based on the privileged access request. Starting time field 338 shows "5/11 09:30". A privileged access request composed as shown would effectively request a modification of the permissions database, such as permissions database 110 of FIG. 1, at 9:30 AM on May 11. In at least some embodiments, starting time field 338 is an input field in which the user directly specifies a portion of the intended starting time. In some embodiments, starting time field 338 is associated with a pop-out calendar, wherein the pop-out calendar is presented to the user for selecting the desired date and time, in response to receipt of a trigger action (e.g., clicking on the starting time field 338, pressing a shortcut key, etc.) from the user.

Ending time field 339 shows an ending time at which privileged access is being requested. In at least some embodiments, ending time field 339 includes a date and a time. In at least some embodiments, ending time field 339 represents the date and time at which a permissions database is reverted from the modification based on the privileged access request. Ending time field 339 shows "5/11 15:00". A privileged access request composed as shown would effectively request a reversion of the modification of the permissions database, such as permissions database 110 of FIG. 1, at 3:00 PM on May 11. In at least some embodiments, a duration of time is included in privileged access request interface 330 instead of ending time field 339. In at least some embodiments, ending time field 338 is an input field in which the user directly specifies a portion of the intended ending time. In some embodiments, ending time field 338 is associated with a pop-out calendar, wherein the pop-out calendar is presented to the user for selecting the desired date and time, in response to receipt of a trigger action (e.g., clicking on the ending time field 338, pressing a shortcut key, etc.) from the user.

Submission field 348 is an area of privileged access request interface 330 that performs an action upon interaction therewith. In at least some embodiments, submission field 448 is presented in a form of a button, a checkbox, or in any other suitable forms which allow the user to trigger to thereby perform said action. In at least some embodiments, submission field 348 is configured to transmit the privileged access request composed in privileged access request interface 330 in response to input from the user terminal. In at least some embodiments, submission field 348 causes the user terminal to transmit contents of the privileged access request interface through an API of an apparatus, such as apparatus 100 of FIG. 1.

FIG. 4 is a graphical user interface for privileged access request review, according to at least some embodiments of the present invention. In at least some embodiments, the privileged access request review interface is any type of interface (e.g., form, chart, table, etc.) which enables a user to review and modify specifics of a privileged access request, and to approve or reject the privileged access request. In at least some embodiments, the graphical user interface is presented by a display of a user terminal, such as second user terminal 118 of FIG. 1 and second user terminal 218 of FIG. 2. In at least some embodiments, the graphical user interface is configured to interact with user input from the user terminal. In at least some embodiments, the graphical user interface is configured to receive and display information from an apparatus, such as apparatus 100 of FIG. 1. The graphical user interface shows a privileged access request list 440 including a list of privileged access requests, such as privileged access request 441, a user field 432, a device field 434, a privilege level field 436, an impact risk indicator 435, a role risk indicator 437, a starting time field 438, an ending time field 439, a requestor indicator 446, an approval field 448, and a rejection field 449. In at least some embodiments, privileged access request list 440 includes more or less fields than illustrated in FIG. 4, and arrangement of the fields in privileged access request list 440 varies from the arrangement illustrated in FIG. 4. In at least some embodiments, privileged access request list 440 includes additional fields, such as a description field (e.g., for enabling the user to review the reason of requesting the privileged access, etc.), an urgency level field (e.g., for enabling the user to review the urgency of the request, etc.), etc. In at least some embodiments, user field 432, privilege level field 436, impact risk indicator 435, role risk indicator 437, starting time field 438, ending time field 439, and other suitable fields are presented in multiple graphical user interfaces (e.g., multiple forms, a combination of a form and a table, etc.)

Privileged access request list 440 shows, for each privileged access request, a request identifier 442, a request status 444, and a risk level 447. Privileged access request 441 shows "20220511-03" as request identifier 442, "Requested" as request status 444, and "Very High" as risk level 447. In at least some embodiments, privileged access request list 440 includes more or less information than illustrated in FIG. 4. In at least some embodiments, privileged access request list 440 includes a time at which the request was created, a time at which the request was modified, an identifier of the user who modified the request, an urgency level of the request, and any other suitable information enabling a user to review all details of the request for making a decision (e.g., approval, rejection, etc.) based thereon.

Privileged access request list 440 is configured to display further details of a listed privileged access request in response to input from the user terminal Privileged access request 441 is highlighted to indicate that the details of privileged access request 441 are shown in user field 432, device field 434, privilege level field 436, impact risk indicator 435, role risk indicator 437, starting time field 438, and ending time field 439, and requestor indicator 446.

User field 432, device field 434, privilege level field 436, starting time field 438, and ending time field 439 are substantially similar in structure and function to user field 332, device field 334, privilege level field 336, starting time field 338, and ending time field 339 of FIG. 3, respectively, except as expressly distinguished. In at least some embodiments, privileged access request list 440 is configured to modify the contents of user field 432, device field 434, privilege level field 436, starting time field 438, and ending time field 439 in response to input from the user terminal.

Impact risk indicator 435 shows an impact risk associated with the privileged access request. In at least some embodiments, impact risk indicator 435 shows an impact risk based on an impact risk profile retrieved by an apparatus, such as apparatus 100 of FIG. 1, the impact risk profile corresponding to the devices in device field 434. Impact risk indicator 435 shows "High". A privileged access request composed as shown would effectively carry an impact risk identified as "High" based on the devices identified as "Router 24" and "Switch 1A5".

Role risk indicator 437 shows a role risk associated with the privileged access request. In at least some embodiments, role risk indicator 437 shows a role risk based on a role risk profile retrieved by an apparatus, such as apparatus 100 of FIG. 1, the role risk profile corresponding to the users in user field 432. Role risk indicator 437 shows "Medium". A privileged access request composed as shown would effectively carry a role risk identified as "Medium" based on the users identified as "User A9", "User 42", and those belonging to "Group 7".

Requestor indicator 446 indicates the user who composed the privileged access request. In at least some embodiments, requestor indicator 446 indicates a user that also appears in user field 432 or a user that does not appear in user field 432. Requestor indicator 446 indicates "User A9" to indicate that privileged access request 441 was composed by "User A9".

Approval field 448 is an area of privileged access request list 440 that performs an action upon interaction therewith. In at least some embodiments, approval field 448 is presented in a form of a button, a checkbox, or in any other suitable forms which allow the user to trigger to thereby perform said action. In at least some embodiments, approval field 448 is configured to transmit authorization of the selected (e.g., highlighted) privileged access request in response to receiving an input from the user terminal. In at least some embodiments, approval field 448 causes the user terminal to transmit authorization of the highlighted privileged access request through an API of an apparatus, such as apparatus 100 of FIG. 1. In at least some embodiments, approval field 448 is configured to transmit authorization of the highlighted privileged access request along with contents of user field 432, device field 434, privilege level field 436, starting time field 438, and ending time field 439 in response to input from the user terminal. In at least some embodiments, modification of the parameters/contents presented in one or more of user field 432, device field 434, privilege level field 436, starting time field 438, and ending time field 439 of a privileged access request is possible upon receiving input from a user device, before approving said privileged access request.

Rejection field 449 is an area of privileged access request list 440 that performs an action upon interaction therewith. In at least some embodiments, rejection field 449 is presented in a form of a button, a checkbox, or in any other suitable forms which allow the user to trigger to thereby perform said action. In at least some embodiments, rejection field 449 is configured to transmit rejection of the selected (e.g., highlighted) privileged access request in response to receiving an input from the user terminal. In at least some embodiments, rejection field 449 causes the user terminal to transmit rejection of the highlighted privileged access request through an API of an apparatus, such as apparatus 100 of FIG. 1. In at least some embodiments, in response to receiving an input from the user terminal on the rejection field 449, a comment window is presented to enable the user to specify the reason(s) of rejection, before the rejection is transmitted.

FIG. 5 is a graphical user interface for device review, according to at least some embodiments of the present invention. In at least some embodiments, the device review interface is any type of interface (e.g., form, chart, table, etc.) which enables a user to review and modify specifics of a device, and to lock or unlock access to the device. In at least some embodiments, the graphical user interface is presented by a display of a user terminal, such as second user terminal 118 of FIG. 1 and second user terminal 218 of FIG. 2. In at least some embodiments, the graphical user interface is configured to interact with user input from the user terminal. In at least some embodiments, the graphical user interface is configured to receive and display information from an apparatus, such as apparatus 100 of FIG. 1. The graphical user interface shows a device list 540 including a list of devices, such as device 541, a device identifier field 542, a status field 544, a device profile field 531, an impact risk indicator 535, an owner indicator 543, an add field 545, an unlock field 548, and a lock field 549. In at least some embodiments, device list 540 includes more or less fields than illustrated in FIG. 5, and arrangement of the fields in device list 540 varies from the arrangement illustrated in FIG. 5. In at least some embodiments, device list 540 includes additional fields, such as a description field (e.g., for enabling the user to review a description of the device, etc.), etc. In at least some embodiments, device identifier field 542, status field 544, device profile field 531, impact risk indicator 535, owner indicator 543, and other suitable fields are presented in multiple graphical user interfaces (e.g., multiple forms, a combination of a form and a table, etc.)

Device list 540 shows, for each device, a device identifier 542, a status 544, and a lock status 547. Device 541 shows "Router 24" as device identifier 542, "Non-Compliant" as status 544, and "Unlocked" as lock status 547. In at least some embodiments, device list 540 includes more or less information than illustrated in FIG. 5.

Device list 540 is configured to display further details of a listed device in response to input from the user terminal Device 541 is highlighted to indicate that the details of device 541 are shown in device identifier field 542, status field 544, device profile field 531, impact risk indicator 535, and owner indicator 543.

Impact risk indicator 535 is substantially similar in structure and function to impact risk indicator 435 of FIG. 4, except as expressly distinguished.

Device identifier field 542 shows a string used to identify the device. In at least some embodiments, device identifier field 542 includes a device identifier name Device identifier field 542 shows "Router 24", which is the name of device 541. In at least some embodiments, device identifier field 542 is an input field in which the user directly specifies, or modifies, a device identifier name. In at least some embodiments, device list 540 is configured to modify the contents of device identifier field 542 in response to input from the user terminal.

Status field 544 shows a current status of the device. In at least some embodiments, status field 544 includes a status name Status field 544 shows "Non-Compliant", which is the current status of device 541. In at least some embodiments, status field 544 is an input field in which the user directly specifies, or modifies, a status. In some embodiments, status field 544 includes a drop-down list presenting status(es) available to the user reviewing the device listing. In at least some embodiments, device list 540 is configured to modify the contents of status field 544 in response to input from the user terminal.

Device profile field 531 shows a device profile that defines properties of the device. In at least some embodiments, device profile field 531 includes a device profile name Device profile field 531 shows "Router", which is the name of the device profile defining properties of device 541. In at least some embodiments, device profile field 531 is an input field in which the user directly specifies, or modifies, a device profile name. In some embodiments, device profile field 531 includes a drop-down list presenting device profile(s) available to the user reviewing the device. In at least some embodiments, device list 540 is configured to modify the contents of device profile field 531 in response to input from the user terminal.

Owner indicator 543 indicates the owner of the device. Owner indicator 543 indicates "User 42" to indicate that device 541 is owned or managed by "User 42".

Add field 545 is an area of device list 540 that performs an action upon interaction therewith. In at least some embodiments, add field 545 is presented in a form of a button, a checkbox, or in any other suitable forms which allow the user to trigger to thereby perform said action. In at least some embodiments, add field 545 is configured to add information to a new device listing in response to receiving an input from the user terminal. In at least some embodiments, add field 545 causes the user terminal to transmit an instruction to add information, such as the information in device identifier field 542, status field 544, and device profile field 531, through an API of an apparatus, such as apparatus 100 of FIG. 1.

Unlock field 548 is an area of device list 540 that performs an action upon interaction therewith. In at least some embodiments, unlock field 548 is presented in a form of a button, a checkbox, or in any other suitable forms which allow the user to trigger to thereby perform said action. In at least some embodiments, unlock field 548 is configured to transmit an instruction to unlock the selected (e.g., highlighted) device in response to receiving an input from the user terminal. In at least some embodiments, unlock field 548 causes the user terminal to transmit an instruction to unlock the highlighted device through an API of an apparatus, such as apparatus 100 of FIG. 1.

Lock field 549 is an area of device list 540 that performs an action upon interaction therewith. In at least some embodiments, lock field 549 is presented in a form of a button, a checkbox, or in any other suitable forms which allow the user to trigger to thereby perform said action. In at least some embodiments, lock field 549 is configured to transmit an instruction to lock the selected (e.g., highlighted) device in response to receiving an input from the user terminal. In at least some embodiments, lock field 549 causes the user terminal to transmit an instruction to lock the highlighted device through an API of an apparatus, such as apparatus 100 of FIG. 1. Once a device is locked, a user will not be able to create a privileged access request for the device.

FIG. 6 is a graphical user interface for device profile review, according to at least some embodiments of the present invention. In at least some embodiments, the device profile review interface is any type of interface (e.g., form, chart, table, etc.) which enables a user to review and modify specifics of a device profile. In at least some embodiments, the graphical user interface is presented by a display of a user terminal, such as second user terminal 118 of FIG. 1 and second user terminal 218 of FIG. 2. In at least some embodiments, the graphical user interface is configured to interact with user input from the user terminal. In at least some embodiments, the graphical user interface is configured to receive and display information from an apparatus, such as apparatus 100 of FIG. 1. The graphical user interface shows a device profile list 640 including a list of device profiles, such as device profile 641, a device profile identifier field 631, a role identifier field 633, a device field 634, an impact risk indicator 635, a modified-by indicator 643, an add field 645, a save field 648, and a cancel field 649. In at least some embodiments, device profile list 640 includes more or less fields than illustrated in FIG. 6, and arrangement of the fields in device profile list 640 varies from the arrangement illustrated in FIG. 6. In at least some embodiments, device profile list 640 includes additional fields, such as a description field (e.g., for enabling the user to review a description of the device profile, etc.), etc. In at least some embodiments, device profile identifier field 631, role identifier field 633, device field 634, impact risk indicator 635, modified-by indicator 643, and other suitable fields are presented in multiple graphical user interfaces (e.g., multiple forms, a combination of a form and a table, etc.)

Device profile list 640 shows, for each device profile, a profile identifier 642, an impact risk 644, and a role identifier 647. Device profile 641 shows "Router" as profile identifier 642, "High" as impact risk 644, and "Read Only +2" as role identifier 647. In at least some embodiments, device profile list 640 includes more or less information than illustrated in FIG. 6.

Device profile list 640 is configured to display further details of a listed device profile in response to input from the user terminal Device profile 641 is highlighted to indicate that the details of device profile 641 are shown in role identifier field 633, impact risk indicator 635, and modified-by indicator 643.

Device field 634 and impact risk indicator 635 are substantially similar in structure and function to device field 434 and impact risk indicator 435 of FIG. 4, respectively, except as expressly distinguished. Add field 645 is substantially similar in structure and function to add field 545 of FIG. 5, except as expressly distinguished.

Device profile identifier field 631 shows a string used to identify the device profile. In at least some embodiments, device profile identifier field 631 includes a device profile identifier name Device profile identifier field 631 shows "Router", which is the name of device profile 641. In at least some embodiments, device profile identifier field 631 is an input field in which the user directly specifies, or modifies, a device profile identifier name. In at least some embodiments, device profile list 640 is configured to modify the contents of device profile identifier field 642 in response to input from the user terminal.

Role identifier field 633 shows one or more role identifiers that are allowed for access of devices under the device profile or one or more role identifiers that another user can create a privileged access request for. In at least some embodiments, role identifier field 633 includes one or more role identifier names Role identifier field 633 shows "Read Only", "Limited", and "Edit", which are the names of the role identifiers that are allowed for access of devices under the device profile. In at least some embodiments, role identifier field 633 is an input field in which the user directly specifies, to add or modify, a role identifier name. In some embodiments, role identifier field 633 includes a drop-down list presenting role identifier(s) available to the user reviewing the device profile. In at least some embodiments, device profile list 640 is configured to modify the contents of role identifier field 633 in response to input from the user terminal.

Modified-by indicator 643 indicates the user that last modified the device profile. Modified-by indicator 643 indicates "User F7" to indicate that device profile 641 was last modified by "User F7".

Save field 648 is an area of device profile list 640 that performs an action upon interaction therewith. In at least some embodiments, save field 648 is presented in a form of a button, a checkbox, or in any other suitable forms which allow the user to trigger to thereby perform said action. In at least some embodiments, save field 648 is configured to record information to the selected (e.g., highlighted) device profile in response to receiving an input from the user terminal. In at least some embodiments, save field 648 causes the user terminal to transmit an instruction to record information of the highlighted device profile, such as the information in device profile identifier field 631, role identifier field 633, and device list 634, through an API of an apparatus, such as apparatus 100 of FIG. 1.

Cancel field 649 is an area of device profile list 640 that performs an action upon interaction therewith. In at least some embodiments, cancel field 649 is presented in a form of a button, a checkbox, or in any other suitable forms which allow the user to trigger to thereby perform said action. In at least some embodiments, cancel field 649 is configured to revert newly entered information for the selected (e.g., highlighted) device profile in response to receiving an input from the user terminal. In at least some embodiments, cancel field 649 causes the user terminal to transmit an instruction to revert newly entered information of the highlighted device profile, such as newly entered information in role identifier field 633 and device list 634, through an API of an apparatus, such as apparatus 100 of FIG. 1.

FIG. 7 is a graphical user interface for role review, according to at least some embodiments of the present invention. In at least some embodiments, the role review interface is any type of interface (e.g., form, chart, table, etc.) which enables a user to review and modify specifics of a device profile. In at least some embodiments, the graphical user interface is presented by a display of a user terminal, such as second user terminal 118 of FIG. 1 and second user terminal 218 of FIG. 2. In at least some embodiments, the graphical user interface is configured to interact with user input from the user terminal. In at least some embodiments, the graphical user interface is configured to receive and display information from an apparatus, such as apparatus 100 of FIG. 1. The graphical user interface shows a role list 740 including a list of roles, such as role 741, a role identifier field 733, a status field 744, a role risk field 747, a modified-by indicator 743, an add field 745, a modify field 748, and a cancel field 749. In at least some embodiments, role list 740 includes more or less fields than illustrated in FIG. 7, and arrangement of the fields in role list 740 varies from the arrangement illustrated in FIG. 7. In at least some embodiments, role list 740 includes additional fields, such as a description field (e.g., for enabling the user to review a description of the role, etc.), a device field (e.g., for enabling the user to specify the device(s) of which the role is associated to, etc.), etc. In at least some embodiments, role identifier field 733, status field 744, role risk field 747, modified-by indicator 743, and other suitable fields are presented in multiple graphical user interfaces (e.g., multiple forms, a combination of a form and a table, etc.)

Role list 740 shows, for each role, a role identifier 742, a status 744, and a role risk 747. Role 741 shows "Limited" as role identifier 742, "Non-Compliant" as status 744, and "Medium" as role risk 747. In at least some embodiments, role list 740 includes more or less information than illustrated in FIG. 7.

Role list 740 is configured to display further details of a listed role in response to input from the user terminal Role 741 is highlighted to indicate that the details of role 741 are shown in role identifier field 733, status field 744, role risk field 747, and modified-by indicator 743.

Status field 744 is substantially similar in structure and function to status field 544 of FIG. 5, except as expressly distinguished. Modified-by indicator 743, add field 745, and cancel field 749 are substantially similar in structure and function to Modified-by indicator 643, add field 645, and cancel field 649 of FIG. 6, respectively, except as expressly distinguished.

Role identifier field 733 shows a string used to identify the role. In at least some embodiments, role identifier field 733 includes a role identifier name Role identifier field 733 shows "Limited", which is the name of the role 741. In at least some embodiments, role identifier field 733 is an input field in which the user directly specifies, or modifies, a role identifier name. In at least some embodiments, role list 740 is configured to modify the contents of role identifier field 733 in response to input from the user terminal.

Role risk field 747 shows a role risk level of the role. In at least some embodiments, role risk field 747 includes a role risk level. Role risk field 747 shows "Medium", which is the role risk level of role 741. In at least some embodiments, role risk field 747 is an input field in which the user directly specifies, or modifies, a role risk level. In some embodiments, role risk field 747 includes a drop-down list presenting role risk level(s) available to the user reviewing the role. In at least some embodiments, role list 740 is configured to modify the contents of role risk field 747 in response to input from the user terminal.

Modify field 748 is an area of role list 740 that performs an action upon interaction therewith. In at least some embodiments, modify field 748 is presented in a form of a button, a checkbox, or in any other suitable forms which allow the user to trigger to thereby perform said action. In at least some embodiments, modify field 748 is configured to modify information to the selected (e.g., highlighted) role in response to receiving an input from the user terminal. In at least some embodiments, modify field 748 causes the user terminal to transmit an instruction to modify information of the highlighted device, such as the information in role identifier field 733, status field 744, and role risk field 747, through an API of an apparatus, such as apparatus 100 of FIG. 1.

FIG. 8 is a graphical user interface for role risk review, according to at least some embodiments of the present invention. In at least some embodiments, the role risk review interface is any type of interface (e.g., form, chart, table, etc.) which enables a user to review and modify specifics of a device profile. In at least some embodiments, the graphical user interface is presented by a display of a user terminal, such as second user terminal 118 of FIG. 1 and second user terminal 218 of FIG. 2. In at least some embodiments, the graphical user interface is configured to interact with user input from the user terminal. In at least some embodiments, the graphical user interface is configured to receive and display information from an apparatus, such as apparatus 100 of FIG. 1. The graphical user interface shows a role risk list 840 including a list of role risks, such as role risk 841, a role risk identifier field 842, a color field 844, a description field 847, a modified-by indicator 843, an add field 845, a modify field 848, and a cancel field 849. In at least some embodiments, role risk list 840 includes more or less fields than illustrated in FIG. 8, and arrangement of the fields in role risk list 840 varies from the arrangement illustrated in FIG. 8. In at least some embodiments, role risk list 840 includes additional fields. In at least some embodiments, role risk identifier field 842, color field 844, description field 847, modified-by indicator 843, and other suitable fields are presented in multiple graphical user interfaces (e.g., multiple forms, a combination of a form and a table, etc.)

Role risk list 840 shows, for each role, a role risk identifier 842, a color 844, and a modified-by 843. Role risk 841 shows "High" as role risk identifier 842, "Red" as color 844, and "User 6B" as modified-by 843. In at least some embodiments, role risk list 840 includes more or less information than illustrated in FIG. 8.

Role risk list 840 is configured to display further details of a listed role risk in response to input from the user terminal. Role risk 841 is highlighted to indicate that the details of role risk 841 are shown in role risk identifier field 842, color field 844, description field 847, and modified-by indicator 843.

Modified-by indicator 843, add field 845, modify field 848, and cancel field 849 are substantially similar in structure and function to modified-by indicator 743, add field 745, modify field 748, and cancel field 749 of FIG. 7, respectively, except as expressly distinguished.

Role risk identifier field 842 shows a string used to identify the role risk. In at least some embodiments, role risk identifier field 842 includes a role risk name Role risk identifier field 842 shows "High", which is the name of the role risk 841. In at least some embodiments, role risk identifier field 842 is an input field in which the user directly specifies, or modifies, a role risk identifier. In at least some embodiments, role risk list 840 is configured to modify the contents of role risk identifier field 842 in response to input from the user terminal.

Color field 844 shows a color used to indicate the role risk. In at least some embodiments, color field 844 includes a name of a color. Color field 844 shows "Red", which is the color used to indicate role risk 841. In at least some embodiments, color field 844 is an input field in which the user directly specifies, or modifies, a name of a color. In some embodiments, color field 844 includes a drop-down list presenting color(s) available to the user reviewing the role risk. In at least some embodiments, role risk list 840 is configured to modify the contents of color field 844 in response to input from the user terminal.

Description field 847 shows a description of the role risk. In at least some embodiments, description field 847 includes a brief description of situations having the role risk. Description field 847 shows such a brief description, which describes situations of role risk 841.

In at least some embodiments, description field 847 is an input field in which the user directly specifies, or modifies, a description. In at least some embodiments, role risk list 840 is configured to modify the contents of description field 847 in response to input from the user terminal.

FIG. 9 is a graphical user interface for impact risk review, according to at least some embodiments of the present invention. In at least some embodiments, the impact risk review interface is any type of interface (e.g., form, chart, table, etc.) which enables a user to review and modify specifics of a device profile. In at least some embodiments, the graphical user interface is presented by a display of a user terminal, such as second user terminal 118 of FIG. 1 and second user terminal 218 of FIG. 2. In at least some embodiments, the graphical user interface is configured to interact with user input from the user terminal. In at least some embodiments, the graphical user interface is configured to receive and display information from an apparatus, such as apparatus 100 of FIG. 1. The graphical user interface shows an impact risk list 940 including a list of impact risks, such as impact risk 941, an impact risk identifier field 942, a color field 944, a description field 947, a modified-by indicator 943, an add field 945, a modify field 948, and a cancel field 949. In at least some embodiments, impact risk list 940 includes more or less fields than illustrated in FIG. 9, and arrangement of the fields in impact risk list 940 varies from the arrangement illustrated in FIG. 9. In at least some embodiments, impact risk list 940 includes additional fields. In at least some embodiments, impact risk identifier field 942, color field 944, description field 947, modified-by indicator 943, and other suitable fields are presented in multiple graphical user interfaces (e.g., multiple forms, a combination of a form and a table, etc.)

Impact risk list 940 shows, for each role, an impact risk identifier 942, a color 944, and a modified-by 943. Impact risk 941 shows "High" as impact risk identifier 942, "Red" as color 944, and "User 42" as modified-by 943. In at least some embodiments, impact risk list 940 includes more or less information than illustrated in FIG. 8.

Impact risk list 940 is configured to display further details of a listed impact risk in response to input from the user terminal Impact risk 941 is highlighted to indicate that the details of impact risk 941 are shown in impact risk identifier field 942, color field 944, description field 947, and modified-by indicator 943.

Color field 944, description field 947, modified-by indicator 943, add field 945, modify field 948, and cancel field 949 are substantially similar in structure and function to color field 844, description field 847, modified-by indicator 843, add field 845, modify field 848, and cancel field 849 of FIG. 8, respectively, except as expressly distinguished.

Impact risk identifier field 942 shows a string used to identify the impact risk. In at least some embodiments, impact risk identifier field 942 includes an impact risk name Impact risk identifier field 942 shows "High", which is the name of the impact risk 941. In at least some embodiments, impact risk identifier field 942 is an input field in which the user directly specifies, or modifies, an impact risk identifier. In at least some embodiments, impact risk list 940 is configured to modify the contents of impact risk identifier field 942 in response to input from the user terminal.

FIG. 10 is a portion of a permissions database 1010, according to at least some embodiments of the present invention. The portion shows an entry for a user identified as "User A9". The entry includes a role that the user is assigned as default, which may be defined by a role assigned to the user upon registration. For instance, a user registered as a reader will be assigned a reader role, wherein said role may have a basic privilege(s) (e.g., read privilege) which applies to all users having the same role. The default role of "User A9" is indicated as "Read-Only". The entry further includes devices with which the user is assigned a privilege level of "Edit". "User A9" is assigned edit privilege level with "Router 43" and "Switch 26A". The entry further includes devices with which the user is assigned a privilege level of admin. "User A9" is not assigned admin privilege level with any devices. The entry further includes devices with which the user is assigned the ability to authorize privileged access requests. "User A9" is not assigned the ability to authorize privileged access requests with any devices.

FIG. 11 is a portion of an inventory database 1108, according to at least some embodiments of the present invention. The portion shows an entry for a device identified as "Router 24". The entry includes users assigned an edit privilege level for the device. "Group 5", which represents a plurality of user identifiers, is assigned an edit privilege level with "Router 24". The entry includes users assigned an admin privilege level for the device. "User 7A" is assigned an admin privilege level with "Router 24". The entry includes users assigned the ability to authorize privileged access requests for the device. "User E2" is assigned the ability to authorize privileged access requests for "Router 24". The entry further includes an impact risk with which the device is assigned. "Router 24" is assigned an impact risk of "High".

Figure 12:
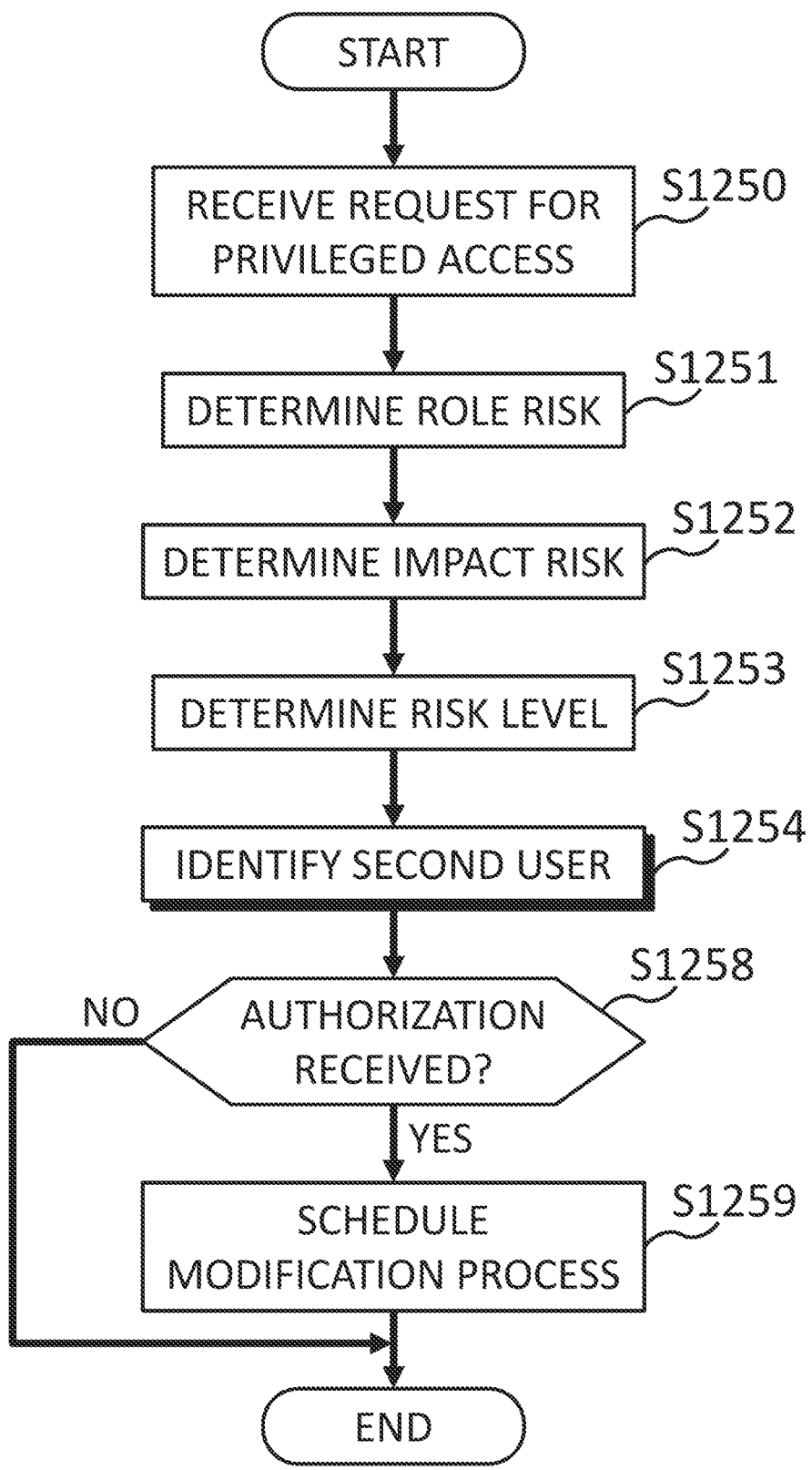
FIG. 12 is an operational flow for privileged access requesting, according to at least some embodiments of the present invention.

FIG. 12 is an operational flow for privileged access requesting, according to at least some embodiments of the present invention. The operational flow provides a method of privileged access requesting. In at least some embodiments, one or more operations of the method are executed by a controller of an apparatus including sections for performing certain operations, such as the controller and apparatus shown in FIG. 10, which will be explained hereinafter.

At S1250, a receiving section receives a request for privileged access. In at least some embodiments, the receiving section receives a request for privileged access to a device connected to a network. In at least some embodiments, the receiving section receives a request for a service that is provided via a device connected to a network, and thus requires privileged access to the device. In at least some embodiments, the request incudes a start time for the access, an end time for the access, a purpose of the request, a level of privilege associated with the access request, an identifier of a user/group for which the privileged access is requested, or the like. In at least some embodiments, the receiving section receives an identifying information of the first user, such as through a user ID, biometric information, or the like. In at least some embodiments, the receiving section associates a request identification (ID) with the request from the first user. In one or more examples, the receiving section associates the request ID with all privileged access requests received from the user. In at least some embodiments, the controller stores a log of privileged access requests associated with the first user in the permissions database.

At S1251, a determining section determines a role risk of the privileged access request. In at least some embodiments, the determining section determines a role risk associated with the request based on a duration of the privileged access, a device identifier, a first user identifier, a requested privilege level included in the request, and/or any other suitable information. In at least some embodiments, the determining section retrieves a role risk profile for the first user from an administrative user based on the list of roles or groups associated with the first user. In at least some embodiments, the determining section determines whether the first user associated with the role or group has a role risk profile in the permissions database. In at least some embodiments, the determining section labels the first user associated with role or group as compliant or non-compliant based on the determination that the first user associated with the role or group does not have a role risk profile. In at least some embodiments, the determining section determines whether the first user associated with a role or group is non-compliant based on a risk profile for the role or group of the first user that has not been configured or approved by the second user. In at least some embodiments, the apparatus is configured to deny privileged access for the first user associated with roles or groups that are non-compliant.

At S1252, a determining section determines an impact risk of the privileged access request. In at least some embodiments, the determining section determines an impact risk associated with the request based on potentially impacted devices other than the device. In at least some embodiments, the impact risk is based on the extent of the impact an outage of a particular device or service will create. In at least some embodiments, the determining section determines the impact risk based on the potential impact associated with a loss of service or a reduction efficiency of the service. In one or more examples, the determining section determines the impact risk of a device based on a number of potentially affected other devices. In one or more examples, an outage in the CU of the Open RAN has a larger impact risk compared to an outage in an RU of one cell site.

In at least some embodiments, the determining section identifies an impact risk profile associated with the device for which privileged access is being requested. In at least some embodiments, the determining section identifies the impact risk profile associated with the device by an administrative user that created the impact risk profile. In at least some embodiments, the determining section retrieves a list of impact risks associated with the device based on the types or groups associated with the device, the services provided by the device, administrators of the device, etc. from the inventory database.

At S1253, a determining section determines a risk level of the privileged access request. In at least some embodiments, the determining section determines a risk level associated with the request based on the role risk and the impact risk. In at least some embodiments, the determining section determines the role risk and the impact risk for the request based on the following formula:

$$\text{Risk Level} = (\text{Role Risk}) \times (\text{Impact Risk}) \qquad \text{EQ. 1}$$

In at least some embodiments, the determining section categorizes the risk level based on a matrix for role risk and impact risk as shown below in Table 1.

TABLE 1

| Risk Level | | Impact risk | | |
| --- | --- | --- | --- | --- |
| Role Risk | Low | Medium | High | |
| Low | Very Low | Low | Medium | |
| Medium | Low | Medium | Very high | |
| High | High | Very High | Highest | |

In at least some embodiments, the determining section determines the risk level by combining the role risk and the impact risk. In one or more examples, when the role risk is medium, and the impact risk is low, the risk level is considered low.

In at least some embodiments, the determining section determines the risk level based on whether a sum of the role risk and the impact risk exceeds a risk threshold. In at least some embodiments, the risk threshold is set such that the normal approval efficiency of routine requests is not affected while requests that could cause serious outages or damage to network devices are more strictly scrutinized and require authorization from multiple second users before approval. In at least some embodiments, the threshold risk is based on the risk level which does not disrupt the efficiency of routine maintenance while flagging requests that could cause substantial disruption to the network. In at least some embodiments, the determining section determines the role risk based on the product of the role risk and the impact risk compared to the threshold risk.

In at least some embodiments, the determining section determines whether the device associated with the type or group does not have an associated impact risk profile, and based on the determination labels the device associated with the type or group as active or inactive.

In at least some embodiments, the determining section determines whether a device associated with a type or group is active or inactive based on whether or not an impact risk profile has been configured and approved by an administrator. In at least some embodiments, the determining section is configured to deny privileged access requests to devices that are associated with types or groups that are inactive.

In at least some embodiments, the privileged access request includes a task to be performed instead of a privilege level. In at least some embodiments, the determining section determines the privilege level that enables the first user to perform a task included in the privileged access request. For example, in response to receiving a request for privileged access to read an event log within a device for troubleshooting, the determining section determines the minimum privilege level required to read the event log within the device, which in this case is enabled by providing read-only access to the device. In at least some embodiments, the determining section determines a minimum privilege level, among read-only access, edit access, admin access, and/or any other suitable privilege access, that enables the first user to perform a task included in the request. In at least some embodiments, the determining section replaces the requested privilege level in the request with the minimum privilege level.

At S1254, an identifying section identifies a second user to authorize the privileged access request. In at least some embodiments, the identifying section identifies a second user to control authorization of the device based on the determined risk level. In at least some embodiments, the identifying section stores the request in association with a second user identifier in response to identifying the second user. In at least some embodiments, the identifying section transmits the request for privileged access to a terminal associated with the second user. In at least some embodiments, the determining section presents the list of impact risks associated with the device to a second user via an API. In at least some embodiments, the identifying section identifies one second user to authorize the privileged access request based on the role risk, and identifies another second user to authorize the privileged access request based on the impact risk. In at least some embodiments, the second user is a group of users, and the identifying section identifies the group of users to control authorization of the device based on the determined risk level. In at least some embodiments, any user of the group of users is enabled to accept to review the privileged access request by triggering an interactive element (e.g., a button, a checkbox, etc.) on a terminal associated with the group of users or associated with the user of the group of users. In at least some embodiments, the identifying section subsequently associates the request with the user identifier of the user of the group of users that accepted review, in a manner so that only the associated user of the group of users is enabled to review the privileged access request and provide authorization thereafter.

At S1258, an authorization receiving section determines whether authorization of the privileged access request is received. In at least some embodiments, the authorization receiving section receives a risk profile for the first user from an administrative user based on the list of roles or groups associated with the first user. In at least some embodiments, the authorization receiving section determines whether the first user associated with the role or group has a risk profile in the permissions database. In at least some embodiments, the authorization receiving section labels the first user associated with role or group as compliant or non-compliant based on the determination that the first user associated with the role or group has or does not have a risk profile. In at least some embodiments, the authorization receiving section determines whether the first user associated with a role or group is non-compliant based on a determination that a risk profile for the role or group of the first user that has not been configured or approved (e.g., by the second user, by the administrative user, etc.) In at least some embodiments, the apparatus is configured to deny the first user (associated with roles or groups that are non-compliant) the privileged access request. If the authorization receiving section determines that authorization is received, then the operational flow proceeds to modification process scheduling at S1259. If the authorization receiving section determines that authorization is not received, such as when rejection of the privileged access request is received, then the operational flow ends. In at least some embodiments, the authorization receiving section transmits a notification message indicating that the privileged access request was unsuccessful to the terminal of the first user in response to determining that authorization is not received. In at least some embodiments, the notification message includes comments from the second user specifying the reason(s) why the privileged access request is unsuccessful or rejected.

At S1259, a scheduling section schedules a modification process of a permissions database. In at least some embodiments, the scheduling section schedules, in response to receiving authorization from the second user, a process to modify an entry in a permissions database to associate the first user identifier and the device identifier with the requested privilege level (which may be the minimum privilege level determined in S1251) for the requested duration. In at least some embodiments, in response to receiving authorization for the first user to access the requested device and/or service, the scheduling section provides time-limited access to the device and/or service for the first user. In at least some embodiments, the scheduling section updates the information in the permissions database at the starting time to enable a user terminal with credentials of the first user to access the device during the scheduled time. In at least some embodiments, the scheduling section schedules a first process to modify the entry in the permissions database to associate the first user identifier and the device identifier with the requested privilege level (instead of a current privilege level) at a starting time included in the request, and schedules a second process to modify the entry in the permissions database to associate the first user identifier and the device identifier with the current privilege level of the first user before the modification of the entry (instead of the requested privilege level) at an ending time included in the request. For example, in response to receiving a request for privileged access to read an event log within a device for troubleshooting, the scheduling section schedules a modification of the access control information in the permissions database at the scheduled time to provide the first user with read-only access to the device, and schedules a modification of the access control information in the permissions database to retract the read-only access to the device and/or service at expiration of the time limit for which the authorization was approved. In at least some embodiments, the scheduling section schedules a process to modify an entry in the permissions database that provisions the first user with the determined granular privilege level to the device at a scheduled start time based on the privileged access request. In at least some embodiments, the scheduling section generates a script, such a CRON script, that executes instructions at a predetermined time.

Figure 13:
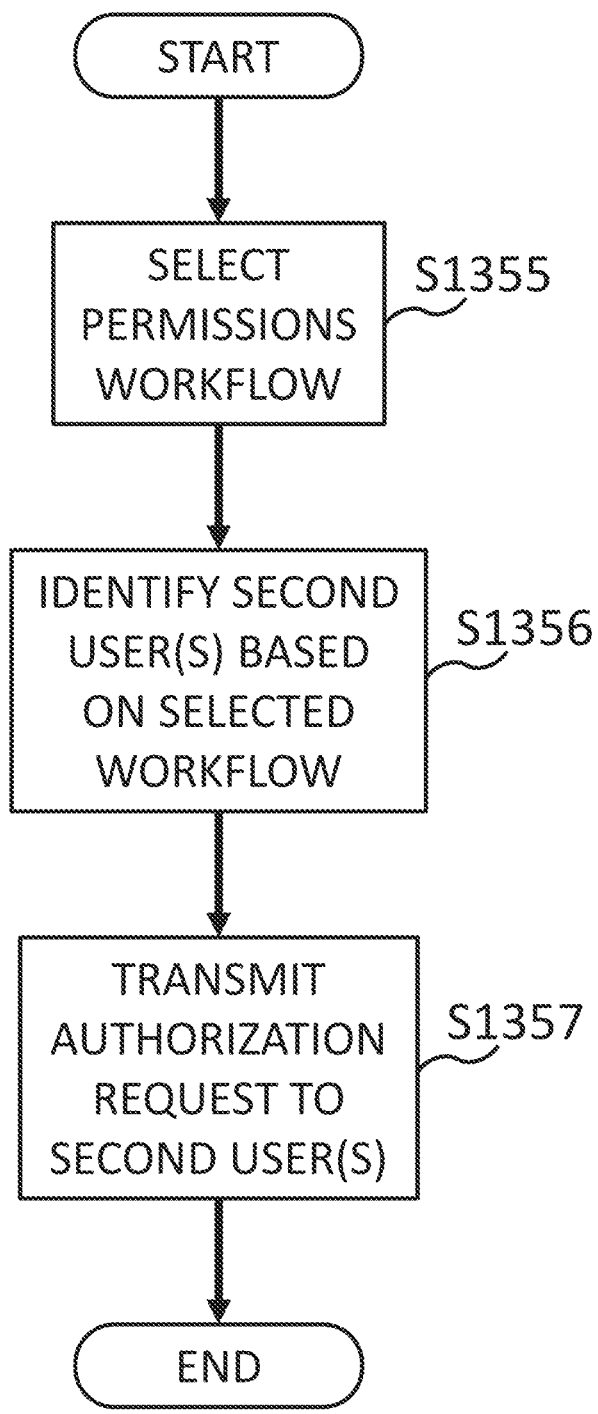
FIG. 13 is an operational flow for second user identification, according to at least some embodiments of the present invention.

FIG. 13 is an operational flow for second user identification, according to at least some embodiments of the present invention. The operational flow provides a method of second user identification. In at least some embodiments, one or more operations of the method are executed by an identifying section of an apparatus, such as the apparatus shown in FIG. 10, which will be explained hereinafter.

At S1355, the identifying section or a sub-section thereof selects a approval workflow for the privileged access request. In at least some embodiments, the identifying section selects a approval workflow for the request based on the risk level. In at least some embodiments, the identifying section selects a approval workflow that identifies an approver or the steps for approval of the request. In at least some embodiments, the identifying section determines an appropriate approval workflow based on the risk level associated with the first user or a device and/or service provider for which access is being requested. In at least some embodiments, the identifying section dynamically determines the risk level associated with the first user. For example, the determined risk level associated with the first user varies with the details of the privileged access request. In at least some embodiments, the identifying section selects a approval workflow based on information from the inventory database regarding the device, the topology of the device, information from the permissions database, and the like.

In at least some embodiments, the identifying section selects the workflow based on risk factors. In one or more examples, the identifying section determines the risk level based on a service risk, an impact risk or both. In at least some embodiments, the identifying section determines the service risk based on a probability that the first user will cause a problem or introduce a risk. In one or more examples, the probability that the first user terminal causes a problem or introduces a risk is determined based on the experience history of the first user, prior problems cause by the first user, the time elapsed between the prior problem and the current request, or the like. In at least some embodiments, the identifying section determines the risk level based on a role requested or associated with a request. In one or more examples, the identifying section determines the risk associated with the request based on the privilege level to perform the task included in the request. Examples of privilege levels include, read-only, admin, super-admin, or the like. In at least some embodiments, the identifying section selects the workflow based on a threshold value for the service risk associated with a role of the first user when using the service. In at least some embodiments, the identifying section determines the risk level based on the length of time the privilege access is requested, the risk profile associated with a device or a user and the like.

In at least some embodiments, the identifying section selects the permissions workflow based on the role risk and the impact risk. In one or more examples, the role risk describes the risk based on an action of the first user. In one or more examples, the impact risk describes the extent of the impact because of a possible failure or misconfiguration after the request is approved. In at least some embodiments, the permissions workflow describes the authorizations for approval of the request and the second users from which authorization must be obtained.

At S1356, the identifying section or a sub-section thereof identifies a second user based on the workflow selected at S1355. In at least some embodiments, the identifying section identifies the second user based on the approval workflow. In at least some embodiments, the identifying section determines whether a second user controls the authorization to access the device based on the approval workflow. In at least some embodiments, the identifying section determines whether the second user has authority to authorize approval of the request based on the steps in the approval workflow. In at least some embodiments, the controller requests authorization from another user or an additional user, such as the super administrator, based on the risk level. In at least some embodiments, the identifying section determines whether to request a second authorization based on the workflow.

At S1357, the identifying section or a sub-section thereof transmits an authorization request to the second user identified at S1356. In at least some embodiments, the identifying section transmits a request for authorization to a terminal associated with the second user. In at least some embodiments, the identifying section presents the list of groups or roles associated with the first user to the second user via an API. In at least some embodiments, the identifying section enables the second user to visualize, through a user terminal, the groups or roles associated with the first user, the services that are related to the first user, all details of or the essential information of the privileged access request, and the like. In at least some embodiments, the identifying section transmits an authorization request to a third user in response to determining to request a second authorization based on the risk level or the workflow.

Figure 14:
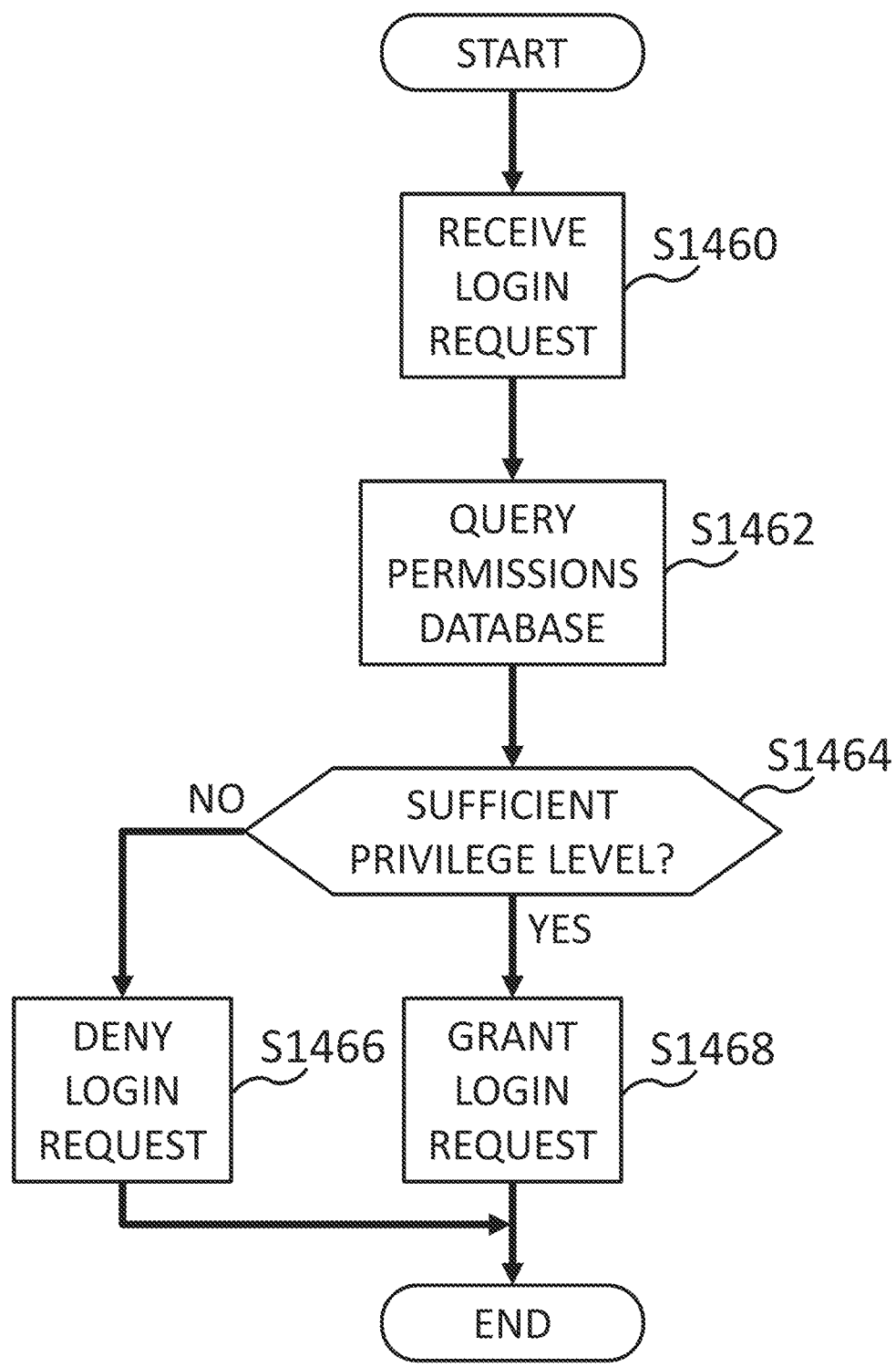
FIG. 14 is an operational flow for privileged access control, according to at least some embodiments of the present invention.

FIG. 14 is an operational flow for privileged access control, according to at least some embodiments of the present invention. The operational flow provides a method of privileged access control. In at least some embodiments, one or more operations of the method are executed by a controller of an apparatus, such as the controller shown in FIG. 10, which will be explained hereinafter.

At S1460, the controller or a section thereof receives a login request. In at least some embodiments, the controller receives a request for login to the device, the request including the first user identifier and the device identifier. In at least some embodiments, the controller receives a login request from a device on the network in response to the device receiving the login request from a user terminal of the first user. In at least some embodiments, the controller receives a login request from the first user on the device on the network.

At S1462, the controller or a section thereof queries a permissions database. In at least some embodiments, the controller queries the permissions database for a current privilege level associated with the first user identifier and the device identifier. In at least some embodiments, the controller determines whether a user of a user terminal is authorized to access the requested device and/or service based on information retrieved from the permissions database. For example, the controller determines whether the user is authorized to access a router in the DU based on the privilege level included in the information retrieved from the permission database. In at least some embodiments, the controller determines whether the first user is authorized to access the device based on an access request query to the permissions database. In at least some embodiments, the controller, based on a determination that the first user is authorized to access the device, allow the first user to access the device consistent with the privilege level.

In at least some embodiments, the controller retrieves a list of groups or roles associated with the first user identifier from the permissions database. In at least some embodiments, the list of groups or roles associated with a user identified by the first user identifier includes the roles/groups of the user, the services created by the user, devices configured by the user, the services managed by the user, the devices managed by the user, or the like. In at least some embodiments, the controller retrieves the list of groups/roles associated with the first user identifier based on the first user identifier supplied by a user terminal to log into the system.

In at least some embodiments, the controller retrieves the list of roles/groups associated with a vendor or a service provider based on the request to access a device in the network from the user identified by the first user identifier on behalf of the vendor/service provider. In at least some embodiments, the controller receives information about the vendor/service provider from the first user identifier when the list of roles/groups associated with the vendor/service provider is not available.

At S1464, the controller determines whether there is sufficient privilege level to grant the login request received at S1460. In at least some embodiments, the controller determines whether there is sufficient privilege level based on the privilege level included in the information retrieved from the permission database and a privilege level included in the login request. If the controller determines that there is sufficient privilege level to grant the login request, then the operational flow proceeds to grant the login request at S1468. If the controller determines that there is insufficient privilege level to grant the login request, then the operational flow proceeds to deny the login request at S1466. In at least some embodiments, the controller determines the group to which the user belongs, and determines, based on the group, whether the user is authorized to access the requested device and/or service.

At S1466, the controller denies the login request. In at least some embodiments, if access to the device and/or service is restricted to a special user, such as an administrator with privileges that are elevated compared to other users or to other administrators, then the user is unable to access the device and/or service unless the permissions database is modified. In at least some embodiments, the controller generates an alert, such as an audio or visual alert, to indicate a potential attempt to breach the network, in response to a determination that the user is not authorized to access the requested device and/or service. In at least some embodiments, the controller transmits the alert to a system administrator. In at least some embodiments, the controller transmits a notification message to the first user (i.e., the user providing the login request) indicating that the first user does not have sufficient privilege level to access the requested device and/or service. In at least some embodiments, the notification message includes an interactive element (e.g., a hyperlink, a button, etc.) which, upon triggering by the first user, redirects the first user to an interface (e.g., privileged access request interface described above in relation to FIG. 3, etc.) for creating a privileged access request for accessing the requested device and/or service.

At S1468, the controller grants the login request. In at least some embodiments, the controller grants the request for login according to the current privilege level associated with the first user identifier and the device identifier in the permissions database.

Figure 15:
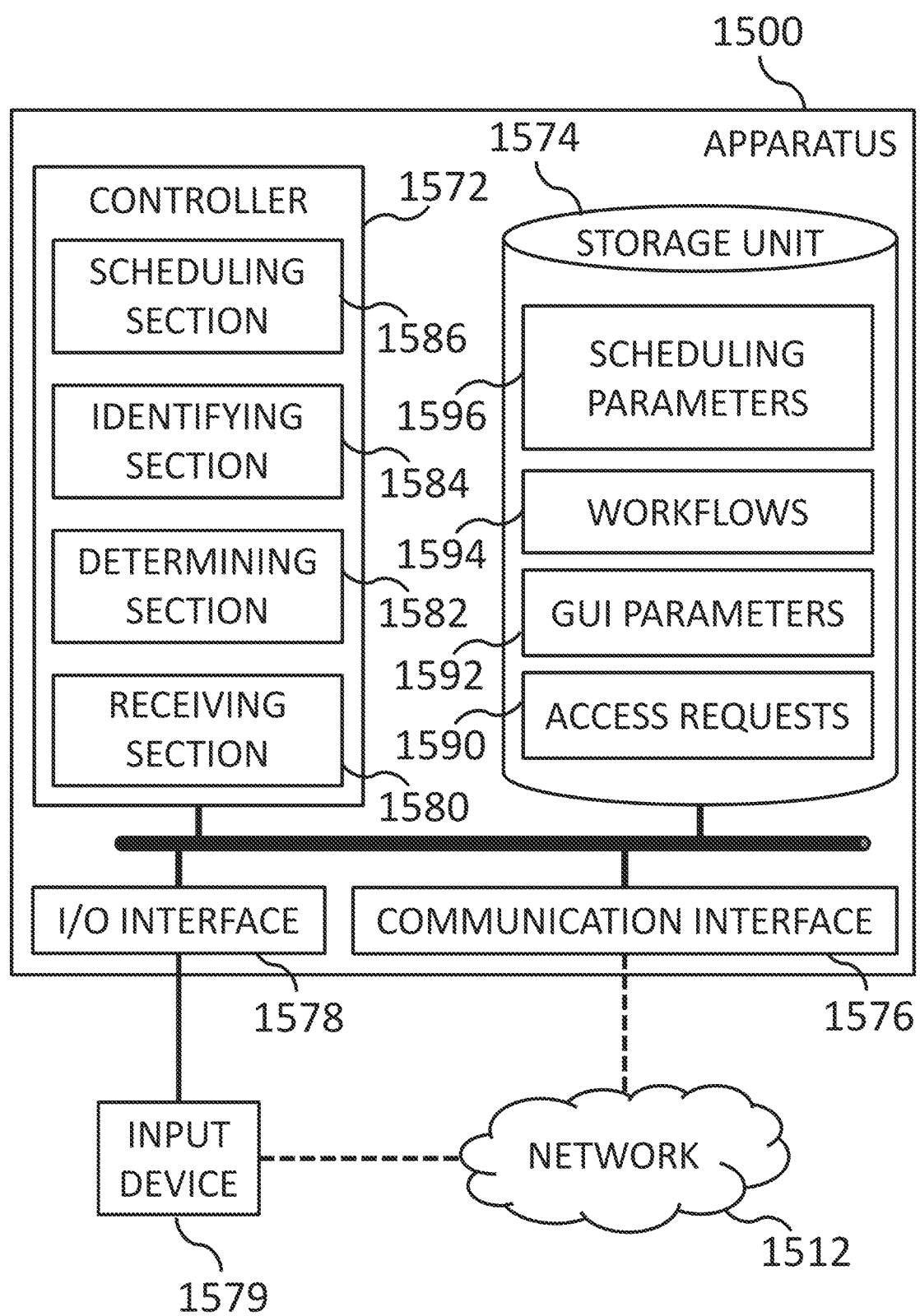
FIG. 15 is a block diagram of a hardware configuration for privileged access requesting, according to at least some embodiments of the present invention.

FIG. 15 is a block diagram of a hardware configuration for privileged access requesting, according to at least some embodiments of the present invention.

The exemplary hardware configuration includes apparatus 1500, which communicates through network 1512, and interacts with input device 1579. In at least some embodiments, apparatus 1500 is a computer or other computing device that receives input or commands from input device 1579. In at least some embodiments, apparatus 1500 is a host server that connects directly to input device 1579, or indirectly through network 1512. In at least some embodiments, apparatus 1500 is a computer system that includes two or more computers. In at least some embodiments, apparatus 1500 is a personal computer that executes an application for a user of apparatus 1500.

Apparatus 1500 includes a controller 1572, a storage unit 1574, a communication interface 1576, and an input/output interface 1578. In at least some embodiments, controller 1572 includes a processor or programmable circuitry executing instructions to cause the processor or programmable circuitry to perform operations according to the instructions. In at least some embodiments, controller 1572 includes analog or digital programmable circuitry, or any combination thereof. In at least some embodiments, controller 1572 includes physically separated storage or circuitry that interacts through communication. In at least some embodiments, storage unit 1574 includes a non-volatile computer-readable medium capable of storing executable and non-executable data for access by controller 1572 during execution of the instructions. Communication interface 1576 transmits and receives data from network 1512. Input/output interface 1578 connects to various input and output units, such as input device 1579, via a parallel port, a serial port, a keyboard port, a mouse port, a monitor port, and the like to accept commands and present information. In some embodiments, storage unit 1574 is external from apparatus 1500. In some embodiments, storage unit 1574 is a cluster of servers, and one or more of the data stored in storage unit 1574 is stored in multiple servers.

Controller 1572 includes receiving section 1580, determining section 1582, identifying section 1584, and scheduling section 1586. Storage unit 1574 includes access requests 1590, graphical user interface parameters 1592, workflows 1594, and scheduling parameters 1596.

Receiving section 1580 is the circuitry or instructions of controller 1572 configured to receive privileged access requests. In at least some embodiments, receiving section 1580 is configured to receive a request for privileged access to a device connected to a network. In at least some embodiments, receiving section 1580 stores information in storage unit 1574, such as access requests 1590 and utilizes information in storage unit 1574, such as graphical user interface parameters 1592. In at least some embodiments, receiving section 1580 includes sub-sections for performing additional functions, as described in the foregoing flow charts. In at least some embodiments, such sub-sections is referred to by a name associated with a corresponding function.

Determining section 1582 is the circuitry or instructions of controller 1572 configured to determine risk levels. In at least some embodiments, determining section 1582 is configured to determine a risk level associated with the request based on the role risk and the impact risk. In at least some embodiments, determining section 1582 is configured to determine a risk level associated with the request based on a duration of the privileged access, a device identifier, a first user identifier, and a requested privilege level included in the request. In at least some embodiments, determining section 1582 utilizes information in storage unit 1574, such as workflows 1594. In at least some embodiments, determining section 1582 includes sub-sections for performing additional functions, as described in the foregoing flow charts. In at least some embodiments, such sub-sections is referred to by a name associated with a corresponding function.

Identifying section 1584 is the circuitry or instructions of controller 1572 configured to identify second users to authorize privileged access requests. In at least some embodiments, identifying section 1584 is configured to identify a second user to control authorization of the device based on the risk level. In at least some embodiments, identifying section 1584 utilizes information from storage unit 1574, such as access requests 1590 and workflows 1594. In at least some embodiments, identifying section 1584 includes sub-sections for performing additional functions, as described in the foregoing flow charts. In at least some embodiments, such sub-sections is referred to by a name associated with a corresponding function.

Scheduling section 1586 is the circuitry or instructions of controller 1572 configured to schedule modifications to a permissions database. In at least some embodiments, scheduling section 1586 is configured to schedule, in response to receiving authorization from the second user, a process to modify an entry in a permissions database to associate the first user identifier and the device identifier with the requested privilege level for the duration. In at least some embodiments, scheduling section 1586 utilizes information from storage unit 1574, such as scheduling parameters 1596. In at least some embodiments, scheduling section 1586 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system. The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

According to at least some embodiments of the present invention, privileged access is managed by receiving a request for privileged access to a device connected to a network, the request including a device identifier and a first user identifier, determining a role risk associated with the request based on a requested privilege level included in the request, determining an impact risk associated with the request based on potentially impacted devices other than the device, determining a risk level associated with the request based on the role risk and the impact risk, identifying a second user to control authorization of the device based on the risk level, and scheduling, in response to receiving authorization from the second user, a process to modify an entry in a permissions database to associate the first user identifier and the device identifier with the requested privilege level for the duration.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-readable medium including instructions executable by a computer to cause the computer to perform operations comprising:
   receiving a request for privileged access to a device connected to a network, the request including a device identifier and a first user identifier;
   determining a role risk associated with the request based on a requested privilege level included in the request;
   determining an impact risk associated with the request based on potentially impacted devices other than the device;
   determining a risk level associated with the request based on the role risk and the impact risk;
   identifying a second user to control authorization of the device based on the risk level; and
   scheduling, in response to receiving authorization from the second user, a process to modify an entry in a permissions database to associate the first user identifier and the device identifier with the requested privilege level for a duration.

2. The computer-readable medium of claim 1, wherein the operations further comprise:
   selecting an approval workflow for the request based on the risk level;
   wherein the identifying the second user is based on the approval workflow.

3. The computer-readable medium of claim 1, wherein the operations further comprise transmitting a request for authorization to a terminal associated with the second user.

4. The computer-readable medium of claim 1, wherein the operations further comprise:
   storing the request in association with a second user identifier in response to identifying the second user; and
   transmitting the request for privileged access to a terminal associated with the second user.

5. The computer-readable medium of claim 1, wherein the scheduling includes
   scheduling a first process to modify the entry in the permissions database to associate the first user identifier and the device identifier with the requested privilege level instead of a current privilege level at a starting time included in the request, and
   scheduling a second process to modify the entry in the permissions database to associate the first user identifier and the device identifier with the current privilege level instead of the requested privilege level at an ending time included in the request.

6. The computer-readable medium of claim 1, wherein the operations further comprise:
   receiving a request to compose the request for privileged access from a terminal; and
   transmitting a plurality of device identifiers, a plurality of user identifiers, and a plurality of privilege levels to the terminal, each device identifier identifying a device connected to the network, each user identifier identifying a user of the network.

7. The computer-readable medium of claim 1, wherein the operations further comprise determining a minimum privilege level, among read-only access, edit access, or admin access, that enables the first user to perform a task included in the request.

8. The computer-readable medium of claim 1, wherein the operations further comprise replacing the requested privilege level in the request with a minimum privilege level.

9. The computer-readable medium of claim 1, wherein the operations further comprise:
   receiving a request for login to the device, the request including the first user identifier and the device identifier;
   querying the permissions database for a current privilege level associated with the first user identifier and the device identifier; and
   granting the request for login according to the current privilege level associated with the first user identifier and the device identifier in the permissions database.

10. A method comprising:
    receiving a request for privileged access to a device connected to a network, the request including a device identifier and a first user identifier;
    determining a role risk associated with the request based on a requested privilege level included in the request;
    determining an impact risk associated with the request based on potentially impacted devices other than the device;
    determining a risk level associated with the request based on the role risk and the impact risk;
    identifying a second user to control authorization of the device based on the risk level; and
    scheduling, in response to receiving authorization from the second user, a process to modify an entry in a permissions database to associate the first user identifier and the device identifier with the requested privilege level for a duration.

11. The method of claim 10, further comprising:
    selecting a approval workflow for the request based on the risk level;
    wherein the identifying the second user is based on the approval workflow.

12. The method of claim 10, further comprising transmitting a request for authorization to a terminal associated with the second user.

13. The method of claim 10, further comprising:
    storing the request in association with a second user identifier in response to identifying the second user; and
    transmitting the request for privileged access to a terminal associated with the second user.

14. The method of claim 10, wherein the scheduling includes
    scheduling a first process to modify the entry in the permissions database to associate the first user identifier and the device identifier with the requested privilege level instead of a current privilege level at a starting time included in the request, and
    scheduling a second process to modify the entry in the permissions database to associate the first user identifier and the device identifier with the current privilege level instead of the requested privilege level at an ending time included in the request.

15. The method of claim 10, further comprising:
    receiving a request to compose the request for privileged access from a terminal; and
    transmitting a plurality of device identifiers, a plurality of user identifiers, and a plurality of privilege levels to the terminal, each device identifier identifying a device connected to the network, each user identifier identifying a user of the network.

16. The method of claim 10, further comprising determining a minimum privilege level, among read-only access, edit access, or admin access, that enables the first user to perform a task included in the request.

17. The method of claim 10, further comprising replacing the requested privilege level in the request with a minimum privilege level.

18. The method of claim 10, further comprising:
    receiving a request for login to the device, the request including the first user identifier and the device identifier;
    querying the permissions database for a current privilege level associated with the first user identifier and the device identifier; and
    granting the request for login according to the current privilege level associated with the first user identifier and the device identifier in the permissions database.

19. An apparatus comprising:
a controller including circuitry configured to:
- receive a request to access a device connected to a network from a first user, wherein the request includes a start time for access to the device;
- retrieve a role risk associated with the first user;
- retrieve an impact risk for the device;
- determine a risk level for the request based on the role risk and the impact risk;
- identify a second user to control authorization of the device based on the risk level; and
- schedule, in response to receiving authorization from the second user, a process to modify an entry in a permissions database at the start time, wherein the entry includes a privilege level based on the risk level.

20. The apparatus of claim 19, wherein the circuitry is further configured to:
- generate a graphical user interface (GUI) for receiving information from the first user;
- retrieve a list of devices connected to the network;
- display the list of devices in the GUI; and
- receive a selection of the device from the first user to generate the request.

* * * * *